Aug. 16, 1960
R. P. PERSON
2,949,265
ARTICULATED AIRCRAFT REFUELING BOOM
Filed March 22, 1954
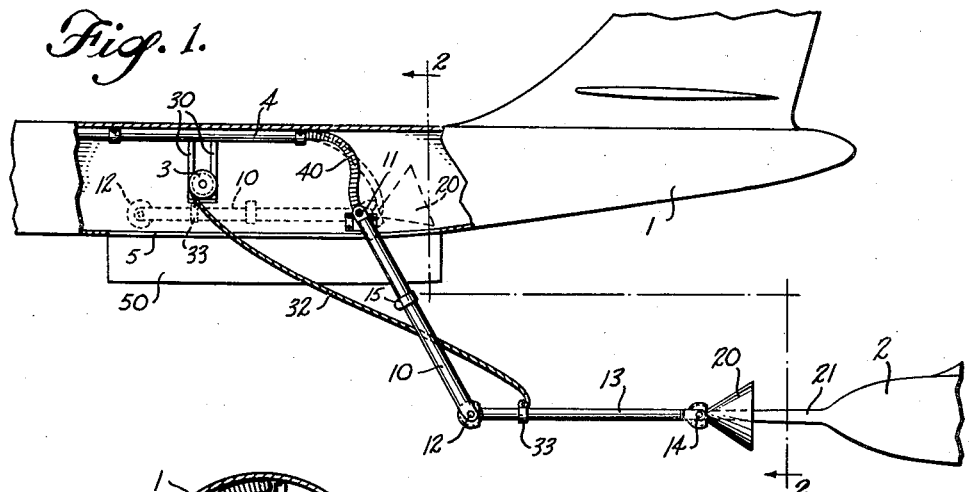
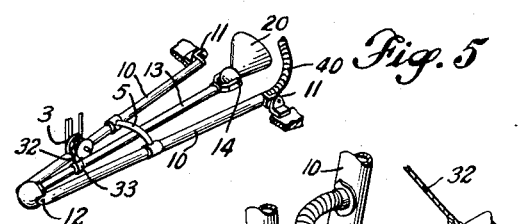
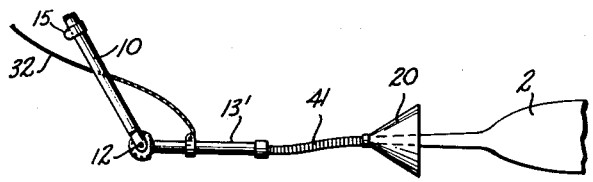
INVENTOR.
ROBERT P. PERSON
BY
Reynolds, Beach & Christensen
ATTORNEYS

United States Patent Office 2,949,265
Patented Aug. 16, 1960

2,949,265

ARTICULATED AIRCRAFT REFUELING BOOM

Robert P. Person, Seattle, Wash., assignor to Boeing Airplane Company, Seattle, Wash., a corporation of Delaware Filed Mar. 22, 1954, Ser. No. 417,871

6 Claims. (Cl. 244—135)

The articulated boom of the present invention is utilized for transferring fuel from a tanker aircraft to an aircraft to be refueled while in flight, and is particularly adapted to interconnection of high-speed airplanes for this purpose.

Various expedients have been proposed for interconnecting aircraft, and particularly airplanes, in flight for refueling purposes, but many of them have been cumbersome and have required much time-consuming manipulation in order to interconnect the aircraft preparatory to the refueling operation. Delay in preparation for and accomplishment of a refueling operation is particularly objectionable for military airplanes, because almost invariably such an operation requires great reduction in speed and maneuverability of the airplanes participating in the operation, so that during this procedure the airplanes are much more vulnerable to attack. It is an important object of the present invention, therefore, to provide mechanism which will enable the refueling operation to be performed efficiently and expeditiously. More specifically, it is an object to provide a refueling conduit mechanism which can be extended quickly from one airplane in flight, and preferably the tanker airplane, for supplying fuel to another airplane in flight.

In the trailing line or hose type of refueling mechanism which has been used in the past a disadvantage has been the necessity of extending such line or hose far to the rear of the tanker airplane in order for it to trail sufficiently far below the tanker airplane to effect rapid transfer of the fuel by gravity. It has been proposed to load such a line or hose with a heavy weight to depress it, but the utilization of such weight is undesirable because of the unnecessary load which it constitutes in the aircraft which must carry it, and further constitutes a dangerous object if struck inadvertently by the other airplane participating in the refueling operation. Also, the great length of line or hose necessary for such equipment adds unnecessary weight to the refueling installation.

Another problem encountered in the use of a long trailing hose was the controllability of such hose, particularly at high speeds. Such a hose would be inclined to whip, thus endangering the other airplane, and sometimes even portions of the airplane from which the hose extended. Such a hose of rubber also is subject to deterioration, and an object of the present invention is to utilize a metal conduit, which is more durable.

Another type of proposal for mechanism to refuel airplanes in flight is a telescoping boom, but such a structure presents difficult sealing problems which are eliminated by the structure of the present invention. With the present construction elements of the conduit remain constant in length, although the location of the portion of the apparatus to be contacted by the cooperating airplane may be varied to a reasonable extent during the refueling operation as the airplanes move relative to each other.

In the use of the boom type of refueling apparatus it is also necessary to provide an operator in the tanker airplane for the purpose of manipulating the position of the boom to contact the airplane to be refueled. By the use of the present invention all maneuvering is done by the receiver airplane.

Whatever type of refueling conduit is utilized, it is necessary for one airplane or the other to carry it and stow it. Ordinarily the conduit is carried and stowed in the tanker airplane to avoid duplication and reduce weight as far as possible in the airplanes to be refueled, because such airplanes normally are intended to fly long distances and consequently should carry minimum weight. The heavier and more bulky the refueling mechanism, the greater is the problem of stowing it and carrying it in the tanker airplane. While it is possible for such apparatus to be arranged in stored position exteriorly of the airplane fuselage, such appendages greatly reduce the speed of the tanker airplane and consequently, in the case of a military airplane, increase its vulnerability and generally reduce its effectiveness. An object of the present invention is to provide refueling conduit mechanism which is both light in weight and compact, so that it can be stored completely within an airplane fuselage and can be extended into refueling position without the necessity of an operator manipulating it into various positions for contact relative to the tanker airplane.

Not only is the refueling boom conduit compact and light, but it is of simple construction and is mounted for quick and effective extension from stowed position into operative position and retraction from operative position into stowed position with a minimum of manipulation.

Advantages of the present invention other than those discussed above will be pointed out in the following description of the preferred constructions shown in the accompanying drawings.

In essence the invention includes an articulated conduit preferably composed of two tubular elongated rigid members pivotally connected, one being a supporting member having one end pivoted to the tanker aircraft, and the other being a supported member having its forward end pivotally connected to the other end of the supporting member. A fuel supply conduit is connected to the anchored end of the articulated conduit, and the trailing end of the conduit is adapted for contact with a receiver airplane and discharge of fuel to such receiver airplane.

Figure 1 is a side elevation view of a tanker airplane equipped with the refueling boom, showing such boom in extended position, and a fragmentary side elevation of the forward portion of the receiver airplane making contact with such boom, part of the tanker airplane being broken away to reveal internal structure.

Figure 2 is a view partly in section and partly in elevation taken on line 2—2 of Figure 1.

Figure 3 is a fragmentary side elevation view of a portion of the structure taken on line 3—3 of Figure 2.

Figure 4 is a side elevation view of a portion of the refueling boom illustrating an alternative type of structure.

Figure 5 is a fragmentary top perspective view of the boom in stored position.

Figure 6 is a detail top perspective view of an alternative type of connection between the boom members.

While the refueling apparatus disclosed in this application could be used for transferring fuel or other liquid between aircraft of various types, it is illustrated in the drawings as incorporated in a tanker airplane 1 to be used for transfer of fuel to a receiver airplane 2. Also, while contact between the refueling boom and the receiver airplane might be established in various ways, the trailing end of the refueling conduit is shown as carrying a funnel 20 into which a probe 21 on the fuselage nose or wing of the receiver airplane may be flown to make automatic contact with the refueling conduit. Such probe is hollow and a conduit within it is connected to the fuel tank of the receiver airplane.

The refueling conduit is composed of two articulated rigid tubular structures including supporting elongated rigid tubular means or frame composed of two convergent tubular struts or legs 10, the anchored ends of which are mounted by pivots 11 on the airplane fuselage. The swinging ends of these rigid tubular struts carry a pivot 12 by which a supported rigid tubular member 13 is connected to the supporting tubular means in a position offset therefrom. The joint between the supporting frame and the supported tubular member 13 may be of universal character, such as the ball and socket joint illustrated in Figures 1 and 4. The trailing end of the supported tubular member 13 carries the funnel 20 by a pivot 14, which again may be a ball and socket type of joint as shown in Figure 1. At least pivots 12 and 14 should be rotatable about axes substantially parallel to the axes of pivots 11, which are substantially horizontal.

The tubular members 10 of the supporting frame are held against relative twisting movement by the yoke bar or spreader bar 15 anchored rigidly to these two members to hold them in predetermined convergent relationship as shown in Figure 2. The central portion of this yoke bar 15 is displaced from a plane parallel to and passing centrally through the adjacent portions of the tubular members 10, such as being curved as shown in Figures 1, 2 and 5 to enable the supported tubular element 13 of the conduit to nest between the elements 10 of the supporting frame. Rearward swinging of the swinging end of the supporting frame is limited by engagement of a stop finger 16 carried by the pivoted end of one of the legs 10 with the lug 17 fixedly mounted on the fuselage in proper position to limit swinging of the supporting frame to the extent desired as shown in Figure 3. When the supporting frame is in the extended position of Figure 1, the force of the air stream acting on the supported tubular member 13 will swing it into substantially horizontal trailing position as shown, without any positive controlling force being exerted on it.

The articulated conduit means may be swung from the extended operative position shown in full lines in Figure 1 into a retracted position received fully within the fuselage, as illustrated in broken lines in that figure, by a simple control mechanism. Such mechanism may include cable-guiding means forward of the frame pivot means 11, which may be a reel 3 suitably supported by struts 30 in the fuselage and driven by an electric motor 31, also supported by such struts. This reel carries a retracting line or cable 32 extending between the legs 10 and beneath the spreader bar 15 to a clamp 33 or other anchor fitting carried by the supported tubular member 13 at a location near its pivotally supported forward end. As this line is reeled in by the drum 3 the resulting force will tend to swing the supported tubular member 13 upward, and the supporting frame forward, until the supported tubular member is stowed in a position nested between and substantially parallel to the legs 10 of the supporting frame in substantially coplanar overlapping relationship, and the supporting frame has been swung upward about its pivots 11 into substantially horizontal position extending forward from such pivots, as indicated in broken lines in Figures 1 and 3. Such parallel disposition of the supported tubular member and the supporting tubular means in stored position is made possible because the supported tubular member is offset from the supporting tubular means formed by the legs 10 of the supporting frame. Because the supporting frame and the supported tubular member 13 are of approximately equal length, this movement will place the funnel 20 adjacent to the pivots 11 of the supporting frame.

In order to effect this retracting operation, the clamp 33 should be located along the supported tubular member 13 in a position substantially at least as far rearward as the motor 31 when the parts are disposed in retracted position. Application of the lifting force to this location of the supported tubular member will have the greatest effect both in lifting the tubular structures and in swinging the supporting frame upwardly with the least stress on the pivots. If the anchor point is too close to the pivot 12, an excessively great force will be required to swing the supported tubular member 13 upward. On the other hand, if the anchor point is too far from pivot 12, the force exerted may have too great an effect to swing the supported tubular member relative to the supporting frame and less effect than desired to swing the supporting frame upward. Thus the location of the motor 31 lengthwise of the tubular structures in stored position, and the location of the force application point 33 should be selected so that the supported tubular member will fold smoothly alongside the supporting frame, and both swing upward, taking into consideration the lengths and weights of the boom structure and the force of the air stream opposing such swinging.

Fuel is supplied to the articulated boom in extended position from a fuel supply pipe 4, which is connected to one tube 10 of the supporting frame by a flexible conduit 40. As the supporting frame is swung upward into retracted position, the flexible conduit 40 will change position, as indicated in broken lines in Figure 1, but need not be disconnected or include swivel joints. A length of flexible conduit may also extend between the tube 10 through which fuel flows and the tubular member 13 to insure a tight joint between them if desired, as shown in Figure 6. In addition, as shown in Figure 4, the universal joint 14 between the tubular member 13 and funnel 20 may be replaced by a length of flexible tubing 41, enabling the funnel to be tilted or displaced laterally relative to the tubular member 13' to some extent, either vertically or horizontally, or both, as may be required.

A particular advantage of the articulated boom structure described is that in retracted position, as shown in broken lines in Figure 1, it is received completely within the fuselage, and the fuselage slot 5 through which the boom is lowered may be closed completely by doors 50, which may be similar to bomb bay doors. Extension of the refueling boom into operative position may be accomplished very expeditiously by swinging open these doors and slackening the cable 32. The initial movement of the articulated boom from stowed position will readily be effected by gravity, and as soon as the boom has moved outward into the air stream, the drag force of the air on it will complete movement of the boom fully into operative position.

I claim as my invention:

1. The combination of a first aircraft in flight and mechanism for transferring fuel from said first aircraft to a second aircraft in flight, said mechanism comprising first pivot means on said first aircraft, supporting elongated rigid tubular means pivotally carried by said first pivot means for swinging of said rigid tubular means to a position depending from said first aircraft, a supported rigid tubular member offset from said supporting tubular means, second pivot means remote from said first pivot means connecting said supporting tubular means and said supported tubular member and guiding said supporting tubular means and said supported tubular member for relative swinging between an operative position in which said supported tubular member projects a substantial distance behind said supporting tubular means and a stored position in which said supported tubular member is disposed alongside and substantially parallel to said supporting tubular means, means carried by said supported tubular member for connection with such second aircraft, and actuating means connected between said first aircraft and said supported tubular member and operable to swing said supported tubular member relative to said supporting tubular means about said second pivot means into such substantially parallel stored position and said supporting tubular means forwardly and upwardly about said first pivot means.

2. The combination defined in claim 1, in which the actuating means includes cable-guiding means carried by the first aircraft forward of the first pivot means and a cable extending from said cable-guiding means rearwardly past the supporting tubular means and connected to the supported tubular member.

3. The combination defined in claim 2, in which the cable is connected to the supported tubular member closer to the second pivot means than to the means for connection with the second aircraft.

4. Mechanism adapted for refueling in flight a receiver aircraft from a supply aircraft, comprising two elongated rigid supporting members spaced apart transversely of their lengths, separate pivots, one for each of said supporting members, disposed coaxially and adapted to mount corresponding ends of said supporting members respectively on one aircraft, a spreader bar rigidly interconnecting said supporting members at a location remote from said pivots, an enlongated supported member received between said supporting members, pivot means remote from said pivots, connecting said supporting members and said supported member and guiding said supporting members and said supported member for relative swinging between an operative position in which said supported member projects a substantial distance rearwardly from said supporting members and a stored position in which said supported member is nested between said supporting members in substantially coplanar overlapping relationship, the central portion of said spreader bar being sufficiently displaced from a plane parallel to and passing centrally through the adjacent portions of said supporting members as to enable said supported member to be received between said supporting members in such substantially coplanar overlapping relationship, means operatively connected to one of said supporting members for swinging said supporting members and said supported member between such positions, and means carried by said supported member remote from said pivot means adapted to be connected with another aircraft.

5. The mechanism defined in claim 4, in which at least one of the supporting members is a tubular conduit and the supported member is a tubular conduit for flow of liquid therethrough, and fuel-supplying hose means connected to said supporting tubular conduit adjacent to its supporting pivot.

6. The combination of a first aircraft in flight and mechanism for transferring fuel from said first aircraft to a second aircraft in flight, said mechanism comprising first pivot means on said first aircraft, two elongated rigid supporting members pivotally carried by said first pivot means for swinging of said supporting members to a position depending from said first aircraft, said supporting members being spaced apart transversely of the longitudinal axis of said first aircraft and converging away from said first pivot means, at least one of said supporting members being tubular, an elongated rigid tubular supported member received between said supporting members, second pivot means remote from said first pivot means and connecting said supporting members and said supported member for relative swinging between an operative position in which said supported member projects a substantial distance rearwardly from said supporting members and a stored position in which said supported member is nested between said supporting members in substantially coplanar overlapping relationship and said supporting members extend ahead of said first pivot means, a reel carried by said first aircraft forward of said first pivot means, a cable extending from said reel downwardly between said supporting members, means attaching said cable to said supported member at a location closer to said second pivot means than to the rearward end of said supported member, and means for rotating said reel to wind said cable upon said reel for moving said supporting members and said supported member toward such stored position.

References Cited in the file of this patent

UNITED STATES PATENTS

| | | |
|---|---|---|
| 1,716,670 | Sperry | June 11, 1929 |
| 1,867,902 | Weaver | July 19, 1932 |
| 2,388,013 | Rasor | Oct. 30, 1945 |
| 2,454,257 | Rowe | Nov. 16, 1948 |
| 2,523,723 | Santee et al. | Sept. 26, 1950 |
| 2,653,777 | Barkey | Sept. 29, 1953 |
| 2,663,523 | Leisy | Dec. 22, 1953 |

FOREIGN PATENTS

| | | |
|---|---|---|
| 676,430 | Great Britain | July 30, 1952 |